United States Patent
Hodges

(10) Patent No.: US 7,294,420 B2
(45) Date of Patent: Nov. 13, 2007

(54) PRODUCTION OF HYDROGEN

(75) Inventor: Michael Graham Hodges, Wonersh (GB)

(73) Assignee: BP P.L.C., London (GB)

( * ) Notice: Subject to any disclaimer, the term of this patent is extended or adjusted under 35 U.S.C. 154(b) by 334 days.

(21) Appl. No.: 10/487,670

(22) PCT Filed: Aug. 28, 2002

(86) PCT No.: PCT/GB02/03942

§ 371 (c)(1),
(2), (4) Date: Feb. 25, 2004

(87) PCT Pub. No.: WO03/022735

PCT Pub. Date: Mar. 20, 2003

(65) Prior Publication Data

US 2004/0213735 A1    Oct. 28, 2004

(30) Foreign Application Priority Data

Sep. 11, 2001  (GB) .............................. 0121871.8

(51) Int. Cl.
*H01M 8/04* (2006.01)
*C01B 3/24* (2006.01)
*C01B 3/26* (2006.01)

(52) U.S. Cl. ................. 429/17; 423/650; 423/651; 423/652; 423/653; 585/375; 585/446; 585/458; 585/459; 585/462; 585/464; 585/466; 585/709; 585/721; 585/723; 585/726; 585/727; 585/730

(58) Field of Classification Search ........ 423/650–654; 429/17; 585/375, 376, 446–468, 709–732
See application file for complete search history.

(56) References Cited

U.S. PATENT DOCUMENTS

| 3,965,252 | A | | 6/1976 | Kmecak et al. | |
|---|---|---|---|---|---|
| 4,205,196 | A | * | 5/1980 | Makovec et al. | 585/701 |
| 4,929,800 | A | * | 5/1990 | Drago et al. | 585/744 |
| 5,707,923 | A | * | 1/1998 | Hutchens et al. | 585/701 |
| 5,938,800 | A | | 8/1999 | Verrill et al. | |
| 6,048,451 | A | | 4/2000 | Huff, Jr. et al. | |
| 6,348,278 | B1 | * | 2/2002 | LaPierre et al. | 429/17 |
| 6,420,305 | B1 | * | 7/2002 | Matsuzawa et al. | 502/222 |
| 2003/0145514 | A1 | | 8/2003 | Akimoto et al. | |

FOREIGN PATENT DOCUMENTS

| WO | WO 99/19249 | 4/1999 |
|---|---|---|
| WO | WO 99/65097 | 12/1999 |
| WO | WO 02 50217 A1 | 6/2002 |

* cited by examiner

*Primary Examiner*—Wayne A. Langel
(74) *Attorney, Agent, or Firm*—Nixon & Vanderhye

(57) ABSTRACT

A method of producing hydrogen for a fuel cell from a hydrocarbon fuel composition, by providing a hydrocarbon fuel composition, which is obtained by contacting a liquid hydrocarbon feed comprising an alkylating agent with an acidic catalyst, under conditions effective to alkylate at least a portion of the hydrocarbon feed; converting the hydrocarbon fuel composition into hydrogen; and optionally, introducing the hydrogen produced into a fuel cell. In a preferred embodiment the liquid hydrocarbon feed further comprises sulphur-containing impurities, at least a portion of which are alkylated during the alkylation step.

22 Claims, No Drawings

PRODUCTION OF HYDROGEN

This application is the U.S. National Phase of International Application PCT/GB02/03942, filed 28 Aug. 2002, which designated the U.S.

The present invention relates to a method of producing hydrogen for a fuel cell.

A fuel cell is an electrochemical device that combines hydrogen fuel and oxygen from the air to produce electricity, heat and water. A fuel cell operates without combustion, making it a clean and efficient source of energy. There is a growing interest in the use of fuel cells as a source of power for vehicles.

The hydrogen employed in a fuel cell can be stored directly, or produced in-situ, for example, by converting a hydrocarbon into hydrogen and carbon monoxide and/or carbon dioxide. This conversion process may be carried out by partially oxidizing the hydrocarbon, in the presence or absence of a catalyst. Alternatively, the hydrocarbon fuel may be converted into hydrogen by steam reforming, optionally, in the presence of a catalyst.

Attempts have been made to reform conventional motor gasoline to produce hydrogen for fuel cells. However, such attempts can give rise to by-products, such as coke, which damage the reforming catalyst. In addition, sulphur present in the gasoline can lead to degradation of the performance of both the reforming catalyst and the fuel cell stack. A hydrocarbon fuel composition has now been found which alleviates these problems.

According to the present invention, there is provided a method of producing hydrogen for a fuel cell from a hydrocarbon fuel composition, said method comprising the steps of:

providing a hydrocarbon fuel composition, which is obtained by contacting a liquid hydrocarbon feed comprising an alkylating agent with an acidic catalyst, under conditions effective to alkylate at least a portion of the hydrocarbon feed;

converting the hydrocarbon fuel composition into hydrogen; and optionally, introducing the hydrogen produced into a fuel cell.

In a preferred embodiment, the method comprises:

contacting a liquid hydrocarbon feed comprising an alkylating agent with an acidic catalyst, under conditions effective to alkylate at least a portion of the liquid hydrocarbon feed;

recovering at least a portion of the product from the alkylation step to produce a hydrocarbon fuel composition, converting the hydrocarbon fuel composition into hydrogen, and introducing the hydrogen produced into a fuel cell.

The liquid hydrocarbon feed may boil in the range of 10 to 345° C., preferably, in the range of 10 to 249° C. Such feeds may be encountered in the refining of petroleum, as well as in the refining of products from coal liquefaction and the processing of oil shale and tar sands. Such feeds typically comprise complex mixtures of hydrocarbons. Examples of suitable feeds include light naphtha, heavy naphtha, gasoline, kerosene, vis-broken gasoline, cat cracked spirit, coker gasoline and light cycle oil. The feeds may be selectively hydrotreated, for example, before or after they are alkylated. In a preferred embodiment of the invention, naphtha from a catalytic cracking process, or a selectively hydrotreated naphtha (e.g. from a catalytic cracking process) is employed as the liquid hydrocarbon feed. Suitable feeds are described in detail in U.S. Pat. No. 5,863,419, U.S. Pat. No. 6,025,534 and U.S. Pat. No. 6,048,451, the contents of which are incorporated herein by reference.

The liquid hydrocarbon feed comprises an alkylating agent. Such alkylating agents may be added to or inherently present in the feed. Suitable alkylating agents include olefins, alcohols (e.g. primary, secondary and tertiary alcohols) and mixtures thereof. The alkylating agent may comprise 3 to 20 carbon atoms, more preferably, 3 to 10 carbon atoms.

In a preferred embodiment of the invention, one or more olefins are employed as alkylating agents. Suitable olefins include cyclic olefins, substituted cyclic olefins, and olefins of the formula $R_1R_2C=CR_2R_2$, wherein $R_1$ is a hydrocarbyl group, and each $R_2$ is independently, hydrogen or a hydrocarbyl group. Preferred olefins comprise 3 to 15 carbon atoms, more preferably, 4 to 10 carbon atoms, for example, 5 to 7 carbon atoms. Such olefins may be intrinsically present in the liquid hydrocarbon feed, or may be deliberately added to the feed.

Examples of suitable cyclic olefins and substituted cyclic olefins include cyclopentene, 1-methylcyclopentene, cyclohexene, 1-methylcyclohexene, 3-methylcyclohexene, 4-methylcyclohexene, cycloheptene, cyclooctene, and 4-methylcyclooctene.

Examples of suitable olefins of the formula $R_1R_2C=CR_2R_2$ include propene, 2-methylpropene, 1-butene, 2-butene, 2-methyl-1-butene, 3-methyl-1-butene, 2-methyl-2-butene, 2,3-dimethyl-1-butene, 3,3-dimethyl-1-butene, 2,3-dimethyl-2-butene, 2-ethyl-1-butene, 2-ethyl-3-methyl-1-butene, 2,3,3-trimethyl-1-butene, 1-pentene, 2-pentene, 2-methyl-1-pentene 3-methyl-1-pentene, 4-methyl-1-pentene, 2,4-dimethyl-1-pentene, 1-hexene, 2-hexene, 3-hexene, 1,3-hexadiene, 1,4-hexadiene, 1,5-hexadiene, 2,4-hexadiene, 1-heptene, 2-heptene, 3-heptene, 1-octene, 2-octene, 3-octene, and 4-octene.

In addition to an alkylating agent, the liquid hydrocarbon feed may comprise sulphur-containing impurities. Such sulphur containing impurities include aromatic and non-aromatic compounds such as mercaptans, thiophenic and benzothiophenic compounds. Specific examples include thiophene, 2-methylthiophene, 3-methylthiophene, 2,3-dimethylthiophene, 2,5-dimethylthiophene, 2-ethylthiophene, 3-ethylthiophene, benzothiophene, 2-methylbenzothiophene, 2,3-dimethylbenzothiophene, and 3-ethylbenzothiophene. As will be described in greater detail below, at least a portion of the sulphur-containing species in the feed may be alkylated during the alkylation step. Preferably, more than 30%, more preferably, more than 50%, and most preferably, more than 90% of the sulphur-containing species are alkylated.

The liquid hydrocarbon feed may also comprise aromatic compounds, such as toluene, o-m-p-xylene and trimethyl benzene. These species may also be alkylated in the alkylation step, as will be described below.

The liquid hydrocarbon feed may also comprise diolefins. The concentration of diolefins in the feed, however, may be reduced, for example, by selective or conventional hydrotreatment.

When the liquid hydrocarbon feed is contacted with the acidic catalyst under alkylation conditions, at least a portion of the hydrocarbon feed is alkylated. Thus, the concentration of any alkylated species in the feed may increase. At the same time, the concentration of any alkylating agents (e.g. olefins) in the feed may reduce. Where olefins are present in the feed, these may also be oligomerised or isomerised into higher molecular weight products.

Examples of species that may be alkylated in the alkylation step include sulphur-containing impurities and aromatic compounds. Such alkylatable species are alkylated into more heavily substituted, and thus, higher molecular weight products. For example, thiophene may be alkylated to produce an alkylated thiophene, and mercaptans may be alkylated to produce higher sulphide species. It will be appreciated, of course, that both mono- and poly-alkylation reactions may occur. Alkylation reactions are described in more detail in U.S. Pat. No. 5,863,419, U.S. Pat. No. 6,025,534 and U.S. Pat. No. 6,048,451, the contents of which are incorporated herein by reference.

As alkylated products tend to have higher boiling points than their unalkylated counterparts, a portion of the liquid hydrocarbon feed is converted to higher boiling products in the alkylation step. These higher boiling products may be separated, for example, by distillation, as a higher boiling fraction. The final boiling point of this higher boiling fraction may be greater than 170° C., preferably, greater than 200° C., and more preferably greater than 220° C. A lower boiling fraction may also be recovered from the alkylation step, for example by distillation. This lower boiling fraction may have a final boiling point of less than 215° C., more preferably, less than 180° C., for example, between 100 and 175° C.

The lower boiling fraction may comprise hydrocarbons, and a reduced concentration of sulphur-containing impurities and/or aromatic compounds. The olefin concentration in the lower boiling fraction may also be reduced, as olefins originally present in the liquid hydrocarbon feed may either have been involved in the alkylation reaction and/or polymerized to form higher boiling components. In a preferred embodiment, it is this lower boiling fraction which is recovered as the hydrocarbon fuel composition. This hydrocarbon fuel composition is then converted to hydrogen for a fuel cell.

Preferably the alkylation step reduces one or more of the sulphur content, the aromatics content and the olefins content of the hydrocarbon feed. The alkylation step may increase the paraffins content of the hydrocarbon feed. Thus, Cat. Cracked Spirit may be rendered more suitable for use in production of hydrogen for a fuel cell.

In a preferred embodiment, the hydrocarbon fuel composition recovered from the alkylation step has:

an olefin content of less than 40 wt %, preferably, less than 30 wt %, more preferably, less than 20 wt %, and most preferably, less than 10 wt %;

an aromatics content of less than 35 wt %, preferably, less than 25 wt % and more preferably, less than 5 wt %;

a final boiling point (fbp) of less than 215° C., more preferably, less than 180° C., for example, between 100 and 175° C.; and a sulphur content of less than 60 ppm, preferably, less than 10 ppm, more preferably, less than 5 ppm, most preferably, less than 2 ppm.

The hydrocarbon fuel composition may also have a benzene content of less than 5 wt %, preferably, less than 1 wt %. The diolefin content of the composition may also be less than 5 wt %, preferably, less than 1 wt %, more preferably less than 0.1 wt %.

As mentioned above, a higher boiling fraction may be separated from the alkylation reaction. This higher boiling fraction typically contains high boiling components, including aromatic compounds and sulphur-containing impurities. Some of these high boiling components may have been subjected to alkylation, whilst others may not have been alkylated in the alkylation step. Unalkylated impurities include multi-substituted thiophenes, benzothiophene and substituted benzothiophene.

The higher boiling fraction may be alkylated further by contacting the fraction with an acidic catalyst under alkylation conditions. Optionally, an additional alkylating agent may be added to the reaction to facilitate the second alkylation step. Alkylation converts at least a portion of the higher boiling fraction into higher boiling components. These higher boiling components may be separated, for example, by fractional distillation. A second lower boiling fraction may also be recovered from this second alkylation step.

This second lower boiling fraction generally has a reduced concentration of sulphur-containing impurities, and/or aromatic compounds. The second lower boiling fraction may be recovered as the hydrocarbon fuel composition, and converted to hydrogen for a fuel cell. It may be possible to mix the second lower boiling fraction with the first lower boiling fraction to produce a hydrocarbon fuel composition which is suitable for conversion to hydrogen.

The alkylation step may be repeated on the second and subsequent higher boiling fractions to produce third and subsequent higher and lower boiling fractions.

Any suitable acidic catalyst may be employed in the alkylation step of the present invention. Suitable acid catalysts are described in detail in U.S. Pat. No. 5,863,419, U.S. Pat. No. 6,025,534, U.S. Pat. No. 6,048,451 and U.S. Pat. No. 6,059,962, which is incorporated herein by reference. Such acids include Bronstead acids such as phosphoric acid, sulphuric acid, boric acid, HF, fluorosulphonic acid, trifluoromethanesulphonic acid and dihydroxyfluoroboric acid. Lewis acids such as $BF_3$, $BCl_3$, $AlCl_3$, $AlBr_3$, $FeCl_2$, $FeCl_3$, $ZnCl_2$, $SbF_5$, $SbCl_5$ and combinations of $AlCl_3$ and HCl may also be suitable. The acidic catalyst may be supported or unsupported. In a preferred embodiment, a solid phosphoric acid catalyst is employed.

The alkylation reaction may be carried out at elevated temperature. For example, temperatures in excess of 50° C., preferably, in excess of 100° C., and more preferably, in excess of 125° C. may be employed. In a preferred embodiment, the alkylation reaction is carried out at 100 to 350° C., preferably, 125 to 250° C. Where multiple alkylation steps-are performed, the alkylation temperature may be-different for each subsequent alkylation step.

Reaction pressures range from 0.01 to 200 atm., preferably, 1 to 100 atm. Further details on suitable alkylation conditions are described in U.S. Pat. No. 5,863,419, U.S. Pat. No. 6,025,534, U.S. Pat. No. 6,048,451 and U.S. Pat. No. 6,059,962.

In a preferred embodiment, the method of the present invention further comprises a hydrodesulphurisation step. This hydrodesulphurisation reaction may be carried out before, at the same time, or after the alkylation step. In a preferred embodiment, the hydrocarbon fuel composition recovered from the alkylation reaction is hydrodesulphurised to reduce its sulphur concentration further. Conventional and/or selective hydrodesulphurisation methods may be employed. Once hydrodesulphurised, the hydrocarbon fuel composition may be converted to hydrogen.

In addition or as an alternative to the hydrodesulphurisation step, it may be possible to pass the whole or any sub-fraction of the hydrocarbon fuel composition through a desulphurisation device, such as a sulphur trap. Such a device may be a liquid, liquid/liquid or solid based system and may be employed to remove any sulphur-containing impurities from the hydrocarbon fuel composition, for example, by adsorption, absorption or otherwise. Sulphur traps may be particularly effective for the removal of sulphide and mercaptan impurities in the hydrocarbon fuel composition.

The hydrocarbon fuel composition may have a Motor Octane Number (MON) of at least 80, and a Research Octane Number (RON) of at least 90. Preferably, the fuel composition has an MON of at least 85, and an RON of at least 95.

The hydrocarbon fuel composition may have a Reid Vapor Pressure (RVP) of up to 100, preferably, 35 to 100, more preferably, 45 to 100 kPa.

The density of the hydrocarbon fuel composition may be greater than 0.4 g/cm$^3$, preferably, greater than 0.5 g/cm$^3$, more preferably, greater than 0.7 g/cm$^3$ and most preferably, between 0.7 and 0.8 g/cm$^3$.

The method of the present invention may further comprise the step of introducing one or more additives to the hydrocarbon fuel composition, before the hydrocarbon fuel composition is converted to hydrogen. Suitable additives include those additives employed in conventional, internal combustion engine gasoline. Such additives include detergents, stability additives, antioxidants and metal deactivators, and any other additive that-would enable the hydrocarbon fuel to be used as a fuel for an internal combustion engine. The hydrocarbon fuel composition may be converted into hydrogen using any suitable technique. For example, partial oxidation and/or reforming may be employed. Typically, the hydrocarbon fuel composition is converted into a product stream comprising hydrogen, and carbon monoxide and/or carbon dioxide. Generally, both carbon monoxide and carbon dioxide are produced. For example, the mole ratio of carbon monoxide to carbon dioxide in the product stream is 0.1:1 to 10:1.

In one embodiment of the invention, the hydrocarbon fuel composition is converted to hydrogen by reacting the composition with steam under steam reforming conditions to produce hydrogen and carbon monoxide and/or carbon dioxide. Steam reforming may be carried out either in the absence or presence of a catalyst. Suitable catalysts are known in the art. They include transition metal catalysts, such as rhodium, nickel, cobalt, platinum, palladium, ruthenium and iridium. Conventional steam reforming temperatures and pressures may be employed.

In another embodiment of the invention, the hydrocarbon fuel composition is converted to hydrogen by reacting composition with oxygen under partial oxidation conditions to produce hydrogen and carbon monoxide and/or carbon dioxide. The partial oxidation reaction may be carried out in the presence or absence of a partial oxidation catalyst. Suitable partial oxidation catalysts are well known in the art. They include transition metal catalysts, such as rhodium, nickel, cobalt, platinum, palladium, ruthenium and iridium. Conventional partial oxidation temperatures and pressures may be employed.

When the hydrocarbon fuel composition is converted to hydrogen, carbon monoxide is also generally produced. In one embodiment of the invention, carbon monoxide is removed from the product stream by oxidation. The reaction converts the carbon monoxide to carbon dioxide, releasing heat in the process. This heat may be used to drive the conversion of the hydrocarbon fuel composition to hydrogen.

Additionally or alternatively, carbon monoxide may be removed by a water shift reaction. In a water shift reaction, carbon monoxide is reacted with water in the presence of a catalyst to produce carbon dioxide and hydrogen. Suitable water shift catalysts include iron oxide and chromic oxide.

The hydrogen produced in the water shift reaction may be combined with the hydrogen produced by conversion of the hydrocarbon fuel composition, and introduced to a fuel cell. The hydrogen produced in the method of the present invention may be introduced to a fuel cell, preferably, a fuel cell for powering a vehicle, such as a car, lorry, truck, sports utility vehicle or bus. The hydrogen may be fed to the fuel cell directly or stored, for example, in a storage unit, prior to being introduced into the fuel cell. Where the hydrogen is stored prior to being introduced to a fuel cell, the storage unit may be located on a fuel-cell powered vehicle and/or at a stationary depot.

Where the fuel cell is employed to power a vehicle, it may be used to generate substantially all the power necessary to meet the energy needs of the vehicle. In certain cases, however, the fuel cell may not be suitable for generating 100% of the power. Thus, additional power sources may be required. Such sources include conventional electrochemical cells, solar cells and internal combustion engines. Where an internal combustion engine is employed, the hydrocarbon fuel composition may be introduced directly into the internal combustion engine, and combusted to generate energy.

It should be noted that the hydrocarbon fuel composition employed in the present invention may also be employed as a gasoline for an internal combustion engine. The invention will now be illustrated by reference to the following experiments.

EXAMPLE 1

A sample of light catalytically cracked naphtha was alkylated, fractionated by distillation and lower boiling fraction caustic extracted to yield a no di-olefin, low sulphur reduced aromatics and olefins fuel, Table 1.

TABLE 1

|  | Feed To Alkylation | Alkylated Product | Alkylated Product Bp < 100 C. | Alkylated Product Bp < 100 C. Caustic Washed |
|---|---|---|---|---|
| Paraffins % wt | 33 | 37 | 59 | 59 |
| Naphthenes % wt | 10 | 8 | 9 | 9 |
| Olefins % wt | 37 | 34 | 28 | 28 |
| Cyclo-Olefins % wt | 6 | 3 | 1 | 1 |
| Aromatics % wt | 13 | 12 | 2 | 2 |
| Mercaptan S ppm wt S | 74 | 21 | 15 | <2 |
| Thiophenic S ppm wt S | 7 | 7 | 1 | 1 |
| Total S ppm wt S | 81 | 98 | 13 | <3 |
| RON | 94 | 94 |  | 91 |
| MON | 80 | 82 |  | 82 |
| (R + M)/2 | 87 | 88 |  | 87 |
| RVP PRVR GRAB (Kpa) | 98 | 81 |  | 92 |
| IBP | 27.2 | 29.6 | 30.0 | 28.4 |
| T50 | 59.4 | 77.8 | 52.8 | 53.3 |
| T90 | 113.3 | 165.4 | 78.3 | 77.9 |
| T95 | 130.0 | 190.2 | 84.4 | 83.8 |
| FBP | 152.9 | 216.7 | 109.4 | 110.8 |

EXAMPLE 2

A sample of a further light catalytically cracked naphtha was alkylated, acid washed, and fractionated by distillation to yield a low sulphur, reduced aromatics and olefins fuel, Table 2.

TABLE 2

|  | Feed to Alkylation | Alkylated Product | Alkylated Product Bp < 160 C. | Alkylated Product Bp < 100 C. |
|---|---|---|---|---|
| Paraffins % wt | 33.3 | 34.1 | 38.0 | 48.0 |
| Naphthenes % wt | 11.1 | 12.3 | 13.0 | 11.8 |
| Olefins % wt | 37.3 | 34.2 | 32.9 | 34.4 |
| Cyclo-Olefins % wt | 5.7 | 3.3 | 3.2 | 1.7 |
| Aromatics % wt | 12.4 | 16.0 | 12.7 | 4.1 |
| Mercaptan S ppm wt S | 6 | 3 | 4 | 6 |
| Thiophenic S ppm wt S | 146 | 200 | 68 | 16 |
| Sulphide S ppm wt S | 58 | 7 | 10 | 6 |
| Total S ppm wt S | 210 | 210 | 82 | 27 |
| RON | 90.8 | 89.5 |  | 88.7 |
| MON | 80 | 79.3 |  | 80.1 |
| (R + M)/2 | 85.4 | 84.4 |  | 84.4 |
| RVP | 61 |  |  | 63.6 |
| Density | 0.7152 | 0.7325 | 0.7177 | 0.6889 |
| IBP | 38.9 | 41.6 | 42.2 | 40.9 |
| T50 | 84.9 | 102.3 | 91.7 | 69.8 |
| T90 | 135.0 | 171.4 | 130.3 | 90.3 |
| T95 | 148.1 | 211.5 | 137.3 | 94.6 |
| FBP | 157.4 | 237.1 | 147.1 | 103.8 |

EXAMPLE 3

The following samples from Table 2 in Example 2 were tested as hydrocarbon fuels in an autothermal reformer as described below:
Sample A: Feed to Alkylation
Sample B: Alkylated Product Bp<160C
Sample C: Alkylated Product Bp<100C All experiments were performed in an autothermal reformer (ATR) rig consisting of a water vaporiser, fuel vaporiser, quartz reactor and gas sampling system. Fuel, water and air were initially supplied to the quartz reactor as a gaseous reactant stream under a first set of conditions of a gas hourly space velocity (GHSV) of 19,000 hr$^{-1}$, a nominal oxygen to carbon molar ratio (O/C) of 0.9 and with a nominal steam to carbon molar ratio (S/C) of 0.5. After one hour under the first set of conditions a rapid step change to a second set of conditions with a nominal steam to carbon molar ratio (S/C) of 0.07 was made, whilst maintaining the GHSV at 19,000 hr$^{-1}$ and the nominal oxygen to carbon molar ratio (O/C) at 0.9. The experiment was run under the second set of conditions for a further one hour. The reforming catalyst used an alumina wash-coated cordierite monolith loaded with 2% wt platinum and 1% wt rhodium and supplied by Johnson Matthey. The cylindrical catalyst was 30 mm long and 27 mm in diameter with 900 channels per square inch (CPI).

A fuel feed stream and an air/water feed stream were pumped into separate vaporisers at flow rates chosen to provide the required O/C and S/C ratios and GHSV in the gaseous reactant stream. The vaporised fuel stream was injected into the mixture of air and steam produced from vaporisation of the air/water feed stream to generate the gaseous reactant stream. Rapid vaporisation of the fuel and air/water feed streams and thorough mixing was achieved by providing large surface areas for heat transfer in the vaporisers and the use of a number of mixing tubes. The gaseous reactant stream was supplied directly into a quartz reactor. This consisted of a vertically arranged 300 mm long reactor feed pipe, which opened out to form a 28 mm diameter reaction zone, with a sinter located at its base. The cylindrical catalyst was wrapped with a suitable sealing material around its circumference and loaded into the reaction zone so it touched the sinter. The gaseous reactant stream preheat temperature was maintained at 300° C. by heating the reactor feed pipe with a first tube furnace, controlled by a thermocouple touching the sinter. The reaction zone of the quartz reactor was enclosed within a second tube furnace. Its temperature was set to the expected catalyst exit temperature on the basis of thermochemical data—namely 839° C. for S/C=0.5 and 880° C. for S/C=0.07. A plug of quartz wool was inserted into the reaction zone above the catalyst to minimise radiation losses from the catalyst.

A gaseous product stream from the catalyst was sampled 10 mm above the upper catalyst surface and its composition was determined by online and offline gas chromatography (GC). The water concentration in the sampled gaseous product stream was calculated from mass balances performed using the GC data and then used for normalisation of those results.

At the end of each two hour experiment, the fuel and air/water feed streams were stopped, a nitrogen purge through the quartz reactor was started and the first (preheat) and second (reaction zone) furnaces powered down. The catalyst was allowed to cool before it was unloaded from the reaction zone.

Carbon accumulated on the catalyst after each two hour long experiment was determined by temperature programmed oxidation (TPO). The catalyst was heated from room temperature to 850° C. at a rate of 20° C./min in a stream of oxygen/helium and the concentration of carbon dioxide evolved throughout this period was measured using a mass spectrometer.

The results from the samples in Example 2 are shown in Table 3. These results show that on the basis of a number of parameters, namely hydrogen production, non-methane hydrocarbon breakthrough and carbon accumulated on the catalyst (catalyst carbon), the alkylated products performed better in an ATR than the hydrocarbon feed. Furthermore, the <100C alkylated product performed better in the ATR than the <160C alkylated product on the basis of the same parameters.

TABLE 3

ATR Rig Results

| Sample | Run No | O/C (molar) | S/C (molar) | C Conversion (% C1) | H$_2$ Production (g/100 g feed) | NMHC* (ppm wt/wt) | Catalyst Carbon (mg) |
|---|---|---|---|---|---|---|---|
| Feed to Alkylation | A1 | 0.88 | 0.49 | 100 | 18.2 | Not available | 33.0 |
|  | A2 | 0.89 | 0.07 | 99 | 15.0 | 103 |  |

TABLE 3-continued

ATR Rig Results

| Sample | Run No | O/C (molar) | S/C (molar) | C Conversion (% C1) | H₂ Production (g/100 g feed) | NMHC* (ppm wt/wt) | Catalyst Carbon (mg) |
|---|---|---|---|---|---|---|---|
| Alkylated Product Bp < 160 C. | B1 | 0.89 | 0.49 | 100 | 18.7 | Not available | 22.0 |
|  | B2 | 0.89 | 0.07 | 99 | 15.0 | 25 |  |
| Alkylated Product Bp < 100 C. | C1 | 0.89 | 0.50 | 101 | 19.3 | Not available | 15.9 |
|  | C2 | 0.90 | 0.07 | 100 | 15.8 | 16 |  |

*NMHC = non methane hydrocarbon breakthrough on C1 basis

What is claimed is:

1. A method of producing hydrogen for a fuel cell from a hydrocarbon fuel composition, said method comprising the steps of:
   (i) contacting a liquid hydrocarbon feed comprising an alkylating agent and aromatic compounds with an acidic catalyst, such that the aromatic compounds and at least a portion of the hydrocarbon feed are alkylated;
   (ii) recovering a lower boiling fraction which comprises hydrocarbons and a reduced concentration of aromatic hydrocarbons as the hydrocarbon fuel composition; and converting the hydrocarbon fuel composition into hydrogen.

2. A method as claimed in claim 1 in which the liquid hydrocarbon feed is selected from the group consisting of light naphtha, heavy naphtha, gasoline, kerosene, vis-broken gasoline, cat. cracked spirit, coker gasoline, light cycle oil, naphtha from a catalytic cracking process, and a selectively hydrotreated naphtha.

3. A method as claimed in claim 1 in which the liquid hydrocarbon feed further comprises sulphur-containing impurities, at least a portion of which are alkylated during the alkylation step.

4. A method as claimed in claim 3 in which more than 30%, of the sulphur-containing species are alkylated during the alkylation step.

5. A method as claimed in claim 3 in which the lower boiling fraction fraction recovered from the alkylation step comprises a reduced concentration of sulphur-containing impurities.

6. A method as claimed in claim 1 in which the lower boiling point fraction is recovered by distillation.

7. A method as claimed in claim 1 in which the lower boiling fraction has a final boiling point of less than 215° C.

8. A method as claimed in claim 1 in which the hydrocarbon fuel composition recovered from the alkylation step has:
   an olefin content of less than less than 40 wt %;
   an aromatics content of less than 35 wt %;
   a final boiling point (fbp) of less than 215° C.; and
   a sulphur content of less than 60 ppm.

9. A method as claimed in claim 1 in which the hydrocarbon fuel composition has a Motor Octane Number (MON) of at least 80, and a Research Octane Number (RON) of at least 90, preferably a MON of at least 85, and an RON of at least 95.

10. A method as claimed in claim 1 which further comprises the step of introducing one or more additives to the hydrocarbon fuel composition, before the hydrocarbon fuel composition is converted to hydrogen.

11. A method as claimed in claim 5 in which the lower boiling point fraction is recovered by distillation.

12. A method as claimed in claim 11 in which the lower boiling fraction has a final boiling point of less than 215° C.

13. A method as claimed in claim 4 in which more than 50% of the sulphur-containing species are alkylated during the alkylation step.

14. A method as claimed in claim 4 in which more than 90% of the sulphur-containing species are alkylated during the alkylation step.

15. A method as claimed in claim 7 in which the lower boiling fraction has a final boiling point of less than 180° C.

16. A method as claimed in claim 7 in which the lower boiling fraction has a final boiling point of between 100 and 175° C.

17. A method as claimed in claim 12 in which the lower boiling fraction has a final boiling point of less than 180° C.

18. A method as claimed in claim 12 in which the lower boiling fraction has a final boiling point of between 100 and 175° C.

19. A method as claimed in claim 8 in which the hydrocarbon fuel composition recovered from the alkylation step has:
   an olefin content of less than less than 30 wt %;
   an aromatics content of less than 25 wt %;
   a final boiling point (fbp) of less than 180° C.; and
   a sulphur content of less than 10 ppm.

20. A method as claimed in claim 8 in which the hydrocarbon fuel composition recovered from the alkylation step has:
   an olefin content of less than less than 20 wt %;
   an aromatics content of less than less than 5 wt %;
   a final boiling point (fbp) of between 100 and 175° C.; and
   a sulphur content of less than 5 ppm.

21. A method as claimed in claim 8 in which the hydrocarbon fuel composition recovered from the alkylation step has:
   an olefin content of less than less than 10 wt %;
   an aromatics content of less than 5 wt %;
   a final boiling point (fbp) of between 100 and 175° C.; and
   a sulphur content of less than 2 ppm.

22. A method as claimed in claim 1, wherein hydrogen produced is introduced into a fuel cell.

* * * * *